(12) United States Patent
Cho et al.

(10) Patent No.: US 9,946,512 B2
(45) Date of Patent: Apr. 17, 2018

(54) ADAPTIVE RADIX EXTERNAL IN-PLACE RADIX SORT

(71) Applicant: International Business Machines Corporation, Armonk, NY (US)

(72) Inventors: Minsik Cho, Austin, TX (US); Brian R. Konigsburg, Austin, TX (US); Vincent Kulandaisamy, Hillsboro, OR (US); Ruchir Puri, Baldwin Place, NY (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 14/865,082

(22) Filed: Sep. 25, 2015

(65) Prior Publication Data

US 2017/0090817 A1   Mar. 30, 2017

(51) Int. Cl.
*G06F 12/0808* (2016.01)
*G06F 12/0815* (2016.01)
*G06F 7/24* (2006.01)

(52) U.S. Cl.
CPC ..................................... *G06F 7/24* (2013.01)

(58) Field of Classification Search
CPC ... G06F 7/36; G06F 9/30; G06F 12/02; G06F 11/14; G06F 17/30
USPC .......................................... 711/171; 707/752
See application file for complete search history.

(56) References Cited

U.S. PATENT DOCUMENTS

| | | | |
|---|---|---|---|
| 4,575,798 A | 3/1986 | Lindstrom et al. | |
| 5,487,164 A | 1/1996 | Kirchhofer et al. | |
| 5,613,088 A * | 3/1997 | Achiwa | G06F 11/1076 360/53 |
| 6,256,713 B1 * | 7/2001 | Audityan | G06F 13/18 711/141 |
| 6,782,410 B1 * | 8/2004 | Bhagat | G06F 9/5027 709/201 |
| 6,842,377 B2 * | 1/2005 | Takano | G11C 7/1021 365/185.21 |
| 7,017,011 B2 * | 3/2006 | Lesmanne | G06F 12/082 711/141 |
| 7,196,942 B2 * | 3/2007 | Khurana | G11C 7/1051 326/38 |

(Continued)

OTHER PUBLICATIONS

Davis, I., "A Fast Radix Sort", The Computer Journal, Jan. 1990, pp. 1-7, vol. 30, No. 1.

*Primary Examiner* — Daniel C Chappell
*Assistant Examiner* — Mohamed Gebril
(74) *Attorney, Agent, or Firm* — Fleit Gibbons Gutman Bongini Bianco PL; Jeffrey N. Giunta

(57) ABSTRACT

Systems and methods for sorting a data set stored on an external device. A plurality of smaller radix sizes are determined, based on a first radix size and performance characteristics of an external data storage device, whose sizes add up to a first radix size for an in-place radix sort. The smaller radix sizes reduce a total time to perform the in-place radix sort. Each level of a multiple level in-place radix sort is performed with the smaller radix sizes. Each level of the sort includes dividing the data set into N buckets; dividing the buffer into N buckets; and iteratively loading a respective segment in each bucket of the data set into a respective bucket of the buffer, performing an in-place radix sort on the data in the buffer, and returning sorted buffer data to the data set on the external storage device.

17 Claims, 11 Drawing Sheets

(56) References Cited

U.S. PATENT DOCUMENTS

| | | | | |
|---|---|---|---|---|
| 7,269,715 B2* | 9/2007 | Le | G06F 9/3802 | 712/215 |
| 7,321,955 B2* | 1/2008 | Ohmura | G06F 12/0804 | 711/113 |
| 7,512,736 B1* | 3/2009 | Overby | G06F 3/0607 | 707/999.202 |
| 7,590,982 B1* | 9/2009 | Weissman | G06F 9/4812 | 710/260 |
| 8,094,157 B1* | 1/2012 | Le Grand | G06F 7/24 | 345/501 |
| 8,122,064 B2* | 2/2012 | Asai | G06F 7/24 | 707/803 |
| 8,230,193 B2* | 7/2012 | Klemm | G06F 3/0608 | 711/114 |
| 8,566,546 B1* | 10/2013 | Marshak | G06F 3/0604 | 711/112 |
| 8,990,527 B1* | 3/2015 | Linstead | G06F 3/0617 | 711/161 |
| 2003/0067461 A1* | 4/2003 | Fletcher | G06T 17/20 | 345/420 |
| 2003/0130981 A1* | 7/2003 | Nehru | G06F 17/30327 | |
| 2003/0158842 A1* | 8/2003 | Levy | G06F 17/30445 | |
| 2004/0068621 A1* | 4/2004 | Van Doren | G06F 12/0828 | 711/144 |
| 2005/0125607 A1* | 6/2005 | Chefalas | G06F 12/0862 | 711/113 |
| 2007/0008328 A1* | 1/2007 | MacWilliams | G06F 12/0646 | 345/530 |
| 2008/0155246 A1* | 6/2008 | Jennings | G06F 9/4401 | 713/2 |
| 2009/0094413 A1* | 4/2009 | Lehr | G06F 3/0605 | 711/112 |
| 2009/0228648 A1* | 9/2009 | Wack | G06F 11/1092 | 711/114 |
| 2009/0282101 A1* | 11/2009 | Lim | G06F 9/5077 | 709/203 |
| 2010/0046267 A1* | 2/2010 | Yan | G11C 16/24 | 365/51 |
| 2010/0050016 A1* | 2/2010 | Franklin | G06F 11/0727 | 714/6.32 |
| 2010/0125712 A1* | 5/2010 | Murase | G06F 11/1458 | 711/162 |
| 2010/0332780 A1* | 12/2010 | Furuya | G06F 3/0689 | 711/162 |
| 2011/0202735 A1* | 8/2011 | Kono | G06F 11/1451 | 711/162 |
| 2011/0307745 A1* | 12/2011 | McCune | G06F 17/30221 | 714/54 |
| 2012/0072908 A1* | 3/2012 | Schroth | G06F 9/5033 | 718/1 |
| 2012/0198107 A1* | 8/2012 | McKean | G06F 13/18 | 710/40 |
| 2013/0007373 A1* | 1/2013 | Beckmann | G06F 12/126 | 711/136 |
| 2013/0067161 A1* | 3/2013 | Chandra | G06F 13/12 | 711/114 |
| 2013/0080805 A1* | 3/2013 | Vick | G06F 8/4432 | 713/320 |
| 2013/0111129 A1* | 5/2013 | Maki | G06F 3/0611 | 711/117 |
| 2013/0152097 A1* | 6/2013 | Boctor | G06F 9/505 | 718/103 |
| 2013/0326270 A1* | 12/2013 | Chen | G06F 11/2089 | 714/6.21 |
| 2014/0003114 A1* | 1/2014 | Pellizzer | H01L 27/2481 | 365/63 |
| 2014/0258670 A1* | 9/2014 | Venkatasubramanian | G06F 12/023 | 711/171 |
| 2016/0170882 A1* | 6/2016 | Choi | G06F 12/0806 | 711/119 |

* cited by examiner

ADAPTIVE RADIX EXTERNAL IN-PLACE RADIX SORT

BACKGROUND

The present disclosure generally relates to the field of sorting sets of data, and more particularly to the field of a performing an in-place radix sort on data stored in external storage devices.

In-place radix sorting is a useful sorting algorithm for sorting large data sets with numeric or string keys. In-place radix sorting is able to be performed on data stored on external storage devices, such as hard disk drive storage devices. The time used to perform an in-place radix sort on data stored in an external storage device may be limited is able to limit the speed of performing an in-place radix sort on the externally stored data.

BRIEF SUMMARY

In one example, a method determines, based on a first radix size and performance characteristics of an external data storage device, a plurality of smaller radix sizes where a sum of smaller radix sizes within the plurality of smaller radix sizes equals the first radix size to be used by an in-place radix sort of a data set stored on the external storage device. The plurality of smaller radix sizes being determined based upon a size of the data set and a buffer size to be used by the in-place radix sort, the plurality of smaller radix sizes being determined based on a reduction of a total time to perform multiple level recursive in-place radix sort on the data stored on the external data storage device where each level of the multiple level recursive in-place radix sort has a respective radix size within the plurality of smaller radix sizes. The multiple level recursive in-place radix sort is performed, based on the determining, on the data stored on the external data storage device where each level of the multiple level recursive in-place radix sort has a respective radix size within the plurality of smaller radix sizes. Each level of the multiple level radix sort includes dividing the data set into N buckets; dividing the buffer into N buckets; and iteratively loading a respective segment in each bucket of the data set into a respective bucket of the buffer, performing an in-place radix sort on the data in the buffer, and returning sorted buffer data to the data set on the external storage device.

In another example, a data set sorting apparatus includes an interface to communicate with an external storage device, a processor coupled to the interface, a memory coupled to the processor, and a data sorting processor, coupled to the processor and the memory. The data sorting processor, when operating, determines, based on a first radix size and performance characteristics of an external data storage device, a plurality of smaller radix sizes where a sum of smaller radix sizes within the plurality of smaller radix sizes equals the first radix size to be used by an in-place radix sort of a data set stored on the external storage device. The plurality of smaller radix sizes being determined based upon a size of the data set and a buffer size to be used by the in-place radix sort, the plurality of smaller radix sizes being determined based on a reduction of a total time to perform multiple level recursive in-place radix sort on the data stored on the external data storage device where each level of the multiple level recursive in-place radix sort has a respective radix size within the plurality of smaller radix sizes. The data sorting processor also performs, based on the determining, the multiple level recursive in-place radix sort on the data stored on the external data storage device where each level of the multiple level recursive in-place radix sort has a respective radix size within the plurality of smaller radix sizes. Each level of the multiple level radix sort includes dividing the data set into N buckets; dividing the buffer into N buckets; and iteratively loading a respective segment in each bucket of the data set into a respective bucket of the buffer, performing an in-place radix sort on the data in the buffer, and returning sorted buffer data to the data set on the external storage device.

In yet another example, a computer program product for sorting a data set includes a storage medium readable by a processing circuit and storing instructions for execution by the processing circuit for performing a method. The method includes determining, based on a first radix size and performance characteristics of an external data storage device, a plurality of smaller radix sizes where a sum of smaller radix sizes within the plurality of smaller radix sizes equals the first radix size to be used by an in-place radix sort of a data set stored on the external storage device. The plurality of smaller radix sizes being determined based upon a size of the data set and a buffer size to be used by the in-place radix sort, the plurality of smaller radix sizes being determined based on a reduction of a total time to perform multiple level recursive in-place radix sort on the data stored on the external data storage device where each level of the multiple level recursive in-place radix sort has a respective radix size within the plurality of smaller radix sizes. The method also includes performing, based on the determining, the multiple level recursive in-place radix sort on the data stored on the external data storage device where each level of the multiple level recursive in-place radix sort has a respective radix size within the plurality of smaller radix sizes. Each level of the multiple level radix sort includes dividing the data set into N buckets; dividing the buffer into N buckets; and iteratively loading a respective segment in each bucket of the data set into a respective bucket of the buffer, performing an in-place radix sort on the data in the buffer, and returning sorted buffer data to the data set on the external storage device.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various examples and to explain various principles and advantages all in accordance with the present disclosure, in which.

DETAILED DESCRIPTION

In-place radix sorting is a useful sorting algorithm for sorting large data sets with numeric or string keys. In-place Radix sorting has a linear run-time and constant memory complexity. Efficient implementation of an in-place radix sort on data stored on external storage devices, such as mechanical hard drives, has several challenges. In the following discussion, external storage generally refers to storage on devices, i.e., external storage devices, whose storage locations are not directly addressed or accessed by a processor performing an in-place radix sort on data stored in those external devices. In contrast to external storage devices, local memory refers to data storage devices that are able to be directly addressed and accessed by a processor. An example of an external storage device is a mechanical hard drive, and an example of local memory is Random Access Memory (RAM) of any suitable type accessed by a processor.

In general, data sets stored on external storage device are larger than the local memory available for storing data to perform an in-place radix sort. Available local memory is able to be restricted in some examples due to one or more of a particular processor executing multiple applications, such as in a virtual environment. Some external storage devices have unique performance characteristics that impact the speed with which data is able to be accessed and manipulated by a processor. For example, the speed at which adjacent data items can be accessed is able to be dependent on the direction of data within the storage. In a hard disk drive, going back to a previous address may need a full disk rotation, which adversely impacts the performance of arbitrary random access to the stored data. Further, many external storage devices are limited in their performance regarding have limited Input/Output requests per second (IOPS). Performance is able to be improved in some instances in light of the limited IOPS performance of some external storage devices by requesting large sets of data with each Input/Output operation.

The below described system and methods improve the performance of in-place radix sorting on data stored on external storage devices. The below examples describe utilizing an adaptive radix size for performing the in-place radix sort, such that the radix size is chosen to increase the size of data that is read from, written to, or both, for each data operation on the external storage device in order to reduce the total time to perform a radix sort. The below examples further describe processing to better utilize processing resources while data is being retrieved from the external storage device into a local memory buffer of the processor performing the in-place radix sort.

Figure 1:
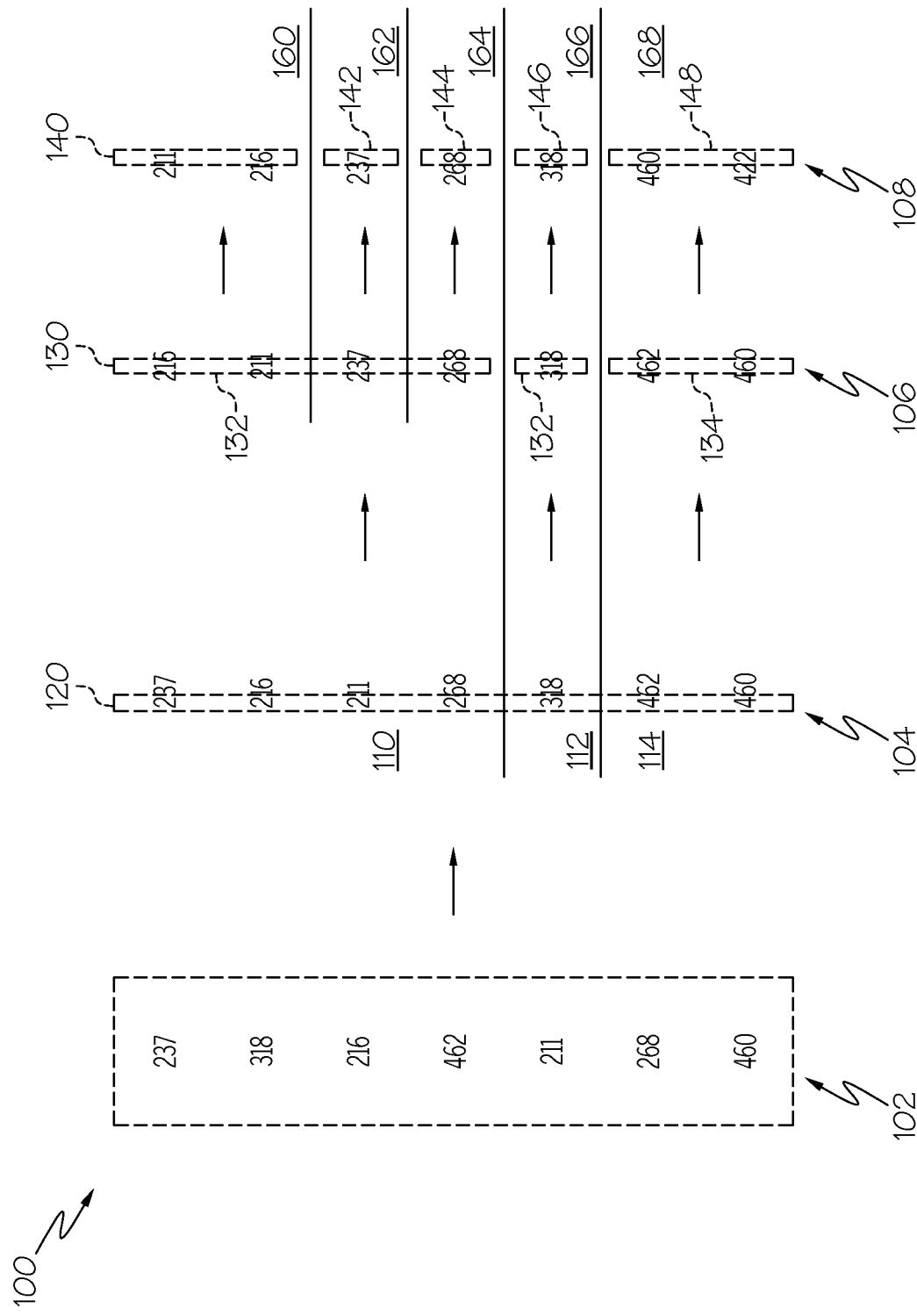
FIG. 1 illustrates an example radix sorting process, in accordance with one example.

FIG. 1 illustrates an example radix sorting process 100, in accordance with one example. The radix sorting process begins with an unsorted data set 102 that is illustrated as a set of seven (7) three digit numbers. In general, an unsorted data set processed by a radix sort algorithm is able to include any number of data items and is in general able to be quite large. In order to more clearly describe certain aspects of this process, a simple example using three digit numbers is illustrated. In general, as is understood by practitioners of ordinary skill in the relevant arts, any type of data is able to be sorted by a radix sort.

In the following discussion, the portion of each data item used as the basis to sort the data set is referred to as the present key. As is generally understood and illustrated in this example, a radix sort is able to iteratively sort data items by progressively ordering the data items according to "keys" or portions of the data. In the illustrated example radix sorting process as is described below, each the data items are iteratively sorted by progressively selecting each digit of the three digit numbers as the present key.

The illustrated example radix sort process 100 first sorts the unsorted data set 102 according to the most significant digit 120 of each data item in the set. The first sorted data set 104 illustrates the data sorted according to only the most significant digit 120 where data items in the 200's precede those in the 300's and the data items in the 400's are last. An example of processing to implement such a radix sort is described in further detail below. In performing a radix sort, the data to be sorted is able to be thought of as being divided into groups where each group contains data having the same current key value. In the following discussion, these groups are referred to as "buckets." In the illustrated example, the data items in the first sorted data set 104 are grouped according to the value of the data items' most significant digit, which is the first key in this example. As illustrated, data items starting with "2" are grouped into a first bucket 110, data items starting with "3" are grouped into a second bucket 112, and data items beginning with "4" are grouped into a third bucket 114. In general, when sorting decimal based numbers, a radix sort uses ten (10) buckets, one for each possible digit value. When sorting data according to other types of keys, such as sorting alphanumeric values, sorting data using keys of arbitrary number of possible values such as keys defined by a certain number of binary bits, or any other type of key, the number of buckets generally equals the number of possible values that the key is able to have in the data set. In the illustrated example radix sort 100, only three of these ten buckets are depicted in order to simplify the description and focus on the relevant concepts.

Although the first sorted data set 104 is sorted according to its most significant digit, the data items in each bucket are otherwise unsorted. The radix sort in this example performs another iteration to further sort the data in each bucket of the first sorted data set according to the next most significant digit, i.e., the second digit of each data item, to produce a second sorted data set 106. In this example, the second digit is the second key used for the radix sort. In the second sorted data set 106, the data in the first bucket 110 is sorted according to the first bucket second digit 130, the data in the second bucket 112 is sorted according to the second bucket second digit 132, and the data in the third bucket 114 is sorted according to the third bucket second digit 134.

Sorting the first sorted data set 104 is based on defining sub-buckets of each bucket defined for the key used to create the first sorted data set i.e., the first key or the most significant digit in this example. Because a radix sort places data into sub-buckets according to values of a second key after that data has been sorted by a first key, the data in the sub-buckets used for sorting on the second key contain data that have the same value for the first key as well as the same value for the second key.

The example radix sort process 100 illustrates a first sub-bucket of the first bucket 160, which contain data items having the same value of the second key, which is the second digit in this example. Because the data set has already been sorted according to the first key, which is the first digit, the data items in the first sub-bucket 160 have the same values of the first key and second key, i.e., 21x, where x is the value of the third digit. Similarly, the second sorted data set 106 has a second sub-bucket of the first bucket 162, and a third sub-bucket of the first bucket 164. Again, in general, there would be ten (10) sub-buckets for each bucket of the first key, but fewer are shown here for simplicity. The second bucket 112 and third bucket 114 are shown to only have one sub-bucket, the first sub-bucket of the second bucket 166 and the first sub-bucket of the third bucket 168, due to the small size of the data set. In general, these buckets used to sort according to the first key would also each have their own ten (10) buckets to reflect the number of possible values of the second key.

Even though the illustrated example illustrates a relatively small data set for simplicity of explanation, each bucket and sub-bucket is in general able to contain many data items. For example, the second bucket 112 of the illustrated example only contains one data item and thus sorting is not really performed in that case. The third bucket 114 contains two data items with the same second digit 134, thus sorting is trivial. Although unlikely, buckets or sub-buckets containing such small amounts of data or data with similar values are able to occur in practice and do not affect the generality of the present discussion.

To complete the sort of the illustrated data set, a third iteration of a radix sort is performed to further sort the second sorted data set 106 according to the next most significant digit, which is the third digit in this example, to create a third sorted data set 108. In this example, each sub-bucket of the second sorted data set 106 is further divided into its own sub-buckets in an iterative fashion according to the above described process. Due to the small size of the illustrated data set, only a few sub-buckets are illustrated. It is to be understood that, in general, performing a radix sort at a given iteration level uses a number of buckets corresponding to the number of possible values for that key in the data.

The third sorted data set 108 depicts data in the first sub-bucket of the first bucket 160 sorted according to the third key, i.e., the third significant digit of the data item. The first sub-bucket of the third bucket 168 has two data items that are sorted according to the third key. The other illustrated sub buckets, i.e., the second sub-bucket of the first bucket 162, the third sub-bucket of the first bucket 164, and the first sub-bucket of the second bucket 166, only have one data item and therefore do not require sorting. As shown, the third sorted data set 108 contains a numerically sorted list of the seven (7) numbers contained in the unsorted data set 102.

Figure 2:
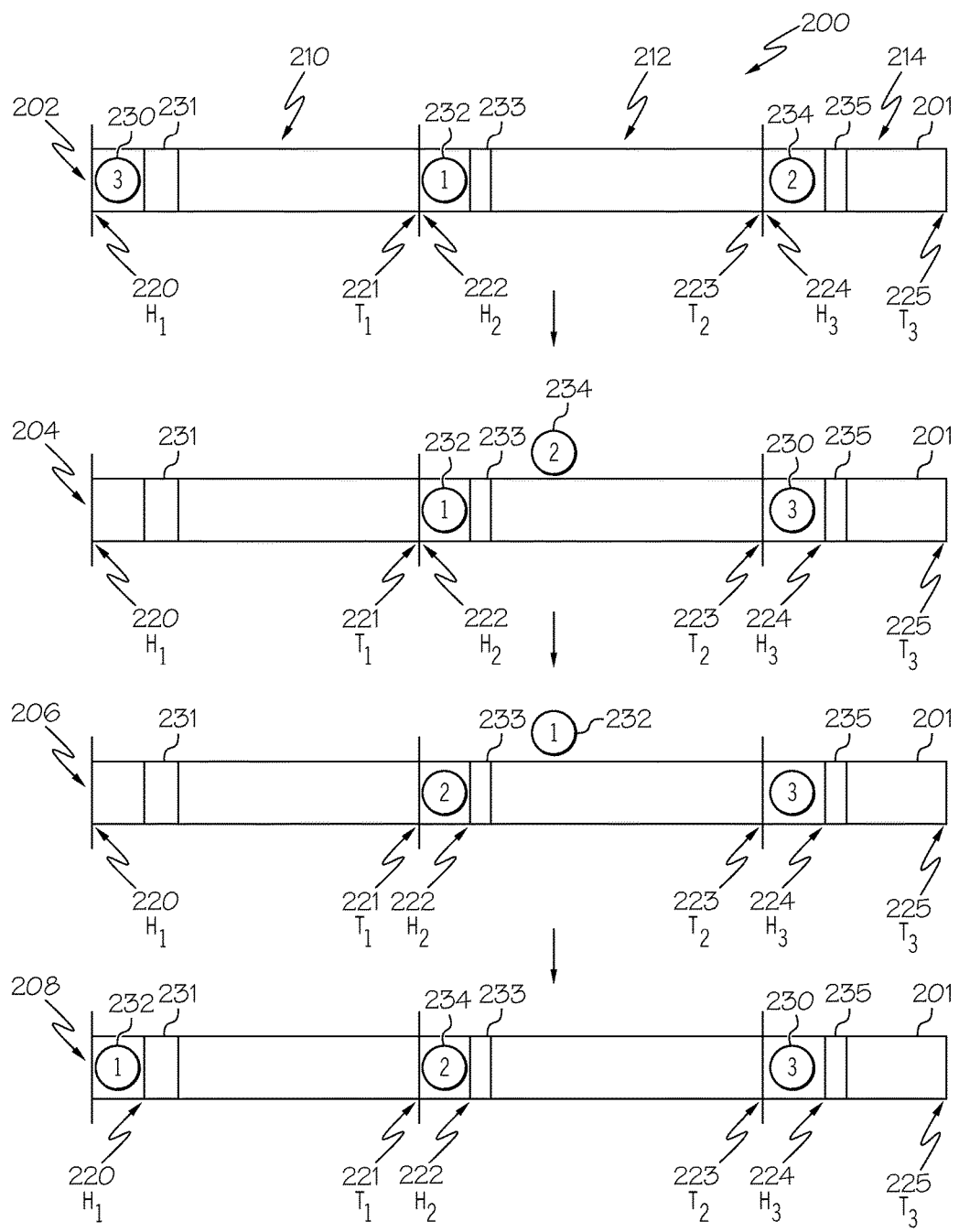
FIG. 2 illustrates an example in-place radix sort process, according to an example.

FIG. 2 illustrates an example in-place radix sort process 200, according to an example. In order to simplify the description of relevant aspects of in-place radix sorting, this example is described without reference to processing associated with performing an in-place radix sort on data stored on an external device. The example in-place radix sort process 200 is a data sorting process that allows a large data set to be sorted by swapping data items in the memory storing the data set. The illustrated example in-place radix sort is used to describe a technique to perform a radix sort on a data set using a particular key, such as a digit in a given position within a number, or an alphanumeric value in a given position in a textual data set. The following description, numeric data is presented where the key has three possible values, 1, 2, or 3. Such a limited range of values is used to simplify the description and is not intended to limit the generality of the description, which is applicable to any data set that can be sorted using keys of any range of values.

The example in-place radix sort process 200 depicts an initial data set 202 that is stored in a data structure 201. In general, the depicted data structure 201 is able to represent any accessible data storage device such as a data vector in a computer memory, data stored on a mass storage device, data stored in any suitable device, or combinations of these. The initial data set 202 is divided into three buckets, a first bucket 210, a second bucket 212, and a third bucket 214. In a manner similar to that discussed above with regards to the example radix sort 100, the example in-place radix sort process 200 presents a simplified illustration of data to more clearly describe relevant concepts and is not a limiting example of performing an in-place radix sort.

The three illustrated buckets are similar to the buckets described above for the example radix sort 100. In this example, the first bucket 210 stores data with a first key value equal to one (1), the second bucket 212 stores data with a first key value equal to two (2), the third bucket 214 stores data with a first key value equal to one (3). A technique to define the division of the initial data set 202 into these buckets is described below. In general, the goal of a first level radix sort is to sort the initial data set 202 such that all of the data items in the first bucket 210 have a first key value equal to one (1), all of the data items in the second bucket 212 have a first key value equal to two (2), all of the data items in the third bucket 214 have a first key value equal to three (3).

The initial data set 202 in this illustrated example is stored as a data vector or similar data structure that contains a number of storage locations where each storage location stores one data item. The initial data set 202 is divided into the three buckets, as discussed above. Initially, all data items of the initial data set 202 are to be processed by the radix sorting process for the first key value. As the radix sort processes the stored data items, more data items are identified to be or are moved to be properly located in the correct bucket, which means that these data items are known to have key values corresponding to the key value associated with that bucket. The data remaining in each bucket that is to be processed by the sorting process is identified by data pointers pointing to certain data items in the data structure 201. At the start of processing, as indicted with the initial data set 202, all data is to be processed by the sorting process. In this example, the start of data to be processed in the first bucket is defined by a first head pointer $H_1$ 220, which points to the first data item in the first bucket 210 within the data structure 201, and a first tail pointer $T_2$ 221, which points to the last data item in the first bucket 210 within the data structure 201. Similarly, the start of data to be processed in the second bucket is indicated by a second head pointer $H_2$ 222, which points to the first data item in the second bucket 212, and a second tail pointer $T_2$ 223, which points to the last data item in the second bucket 212. The start of data to be processed in the third bucket is indicated by a third head pointer $H_3$ 224, which points to the first data item in the third bucket 214, and a third tail pointer $T_2$ 223 points to the last data item in the third bucket 214. As a radix sort progresses, these pointers are generally changed to move towards one another as more data is determined to be located in its proper bucket.

At the head of the first bucket 210 is a first data item 230, pointed to the by first head pointer $H_1$ 220, and is followed by a first bucket second data item 231 within the data structure 201. The key value of the first data item 230 is three (3), as is indicated by the numeral in that data item's depiction. A second data item 232, with a key value of one (1) as indicated by the numeral in its depiction, is at the head of the second bucket 212 and is pointed to by the second head pointer $H_2$ 222. A third data item 234 with a key value of two (2) as indicted by the numeral in its depiction is at the head of the third bucket 214 and is pointed to by the third head pointer $H_3$ 224. The second data item 232 is followed in the data structure 201 by a second bucket second data item 233, and the third data item 234 is followed in the data structure 201 by a third bucket second data item 235.

At the start of the radix sort, the first data item to be processed in the first bucket 210 is indicated by the first head pointer $H_1$ 220. A sorting processor uses the first head pointer $H_1$ 220 to accesses the first data item 230 in this case and determines its key value, which is "3" in this case. The key value of "3" for the first data item 230 indicates that it is incorrectly located in the first bucket 210 and should be placed into the third bucket 214. The sorting processor uses the head pointer for the third bucket 214, i.e., the third head pointer $H_3$ 224, to access the first data item to be processed in the third bucket. In the example illustrated with the initial data set 202, the third head pointer $H_3$ points to the third data item 234, which has a key value of "2," thus indicating that it is incorrectly placed in the third bucket 214 and should be in the second bucket 212.

A first exchanged data set 204 illustrates the location of data after the first data item pointed to by the first head pointer $H_1$ 220 is placed into the first location of the third buffer 214. Because the third data item 234 is improperly located in the third bucket, the sorting processor withdraws the value of the third data item 234 from the location pointed to by the third head pointer and places the first data item 230 into that location. The third head pointer is then incremented to point to the third bucket second data location 235, indicating that the first data item located at the start of the third bucket is properly located.

The first exchanged data set 204 is then similarly processed to properly place the third data item 234 that was extracted from the data structure to place the first data item 230 into the third bucket 214. The third data item 234 has a key value of "2" and thus is to be placed into the second bucket 212. The sorting processor in this case examines the key value of the data item pointed to by the second head pointer H2 222, which is the second data item 232 in this case.

A second exchanged data set 206 is created by placing the third data item 234 into the second bucket 212. The sort processor examines the data item pointed to the by second head pointer 222, which is the second data item 232 in this case. This data item has a key value of indicating that it is not in its proper location. The sort processor extracts the value of the second data item 232 prior to placing the first data item 230 into the location pointed to by the second head pointer $H_2$ 222, and then increments the value of the second head pointer $H_2$ 222 to point to the second bucket second data item 233. The second data item 232 has a key value of "1" and is placed at the location from which the first data item 230 was originally extracted, i.e., the location pointed to by the first head pointer $H_1$ 220. The final exchanged data set 208 in this example is then completed by incrementing the first head pointer $H_1$ 220 to point to the first bucket second data item 231.

In the above example, each head pointer pointed to a data item that was not located in its proper bucket. As is understood by practitioners of ordinary skill in the relevant arts in light of the present discussion, if a head pointer is pointing to a data item that is located in its proper bucket, i.e., the key value of that data item matches the key value associated with that bucket, the head pointer is simply incremented to the next data item in the data structure 201. The data items pointed to by the head pointer are then successively examined as the head pointer is incremented until a data item is pointed to with a key value that does not match the bucket in which it is stored.

In the above example, the head pointers are incremented as more data is processed until the head pointer for a particular bucket points to the same location as the tail pointer for that same bucket. When the head pointer and tail pointer point to the same location, the values of those pointers are said to be equal. A determination is able to be made that there is no more data to process in a particular bucket when the head pointer for that bucket equals the tail pointer.

Figure 3:
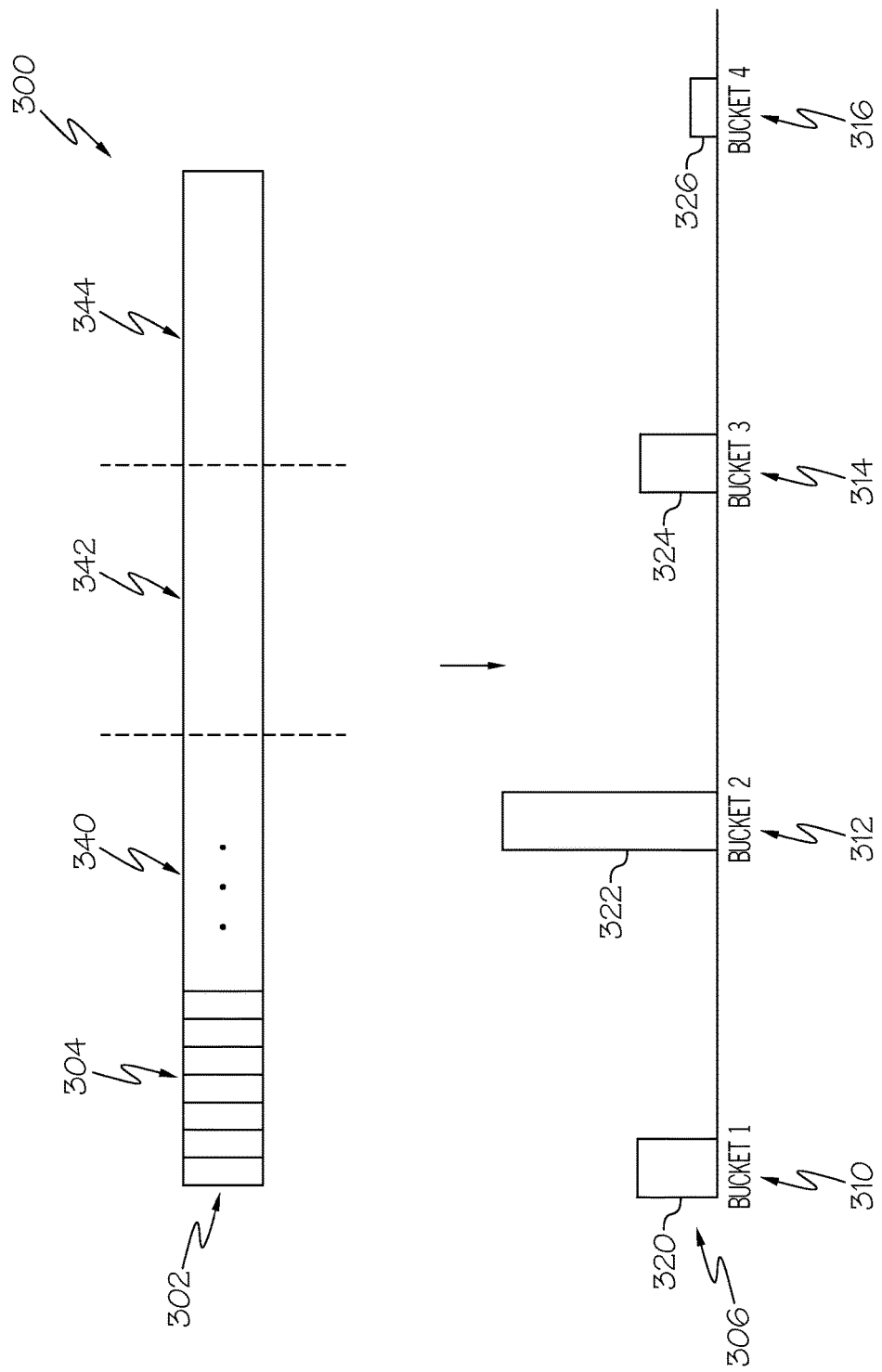
FIG. 3 illustrates an example histogram generation, according to an example.

FIG. 3 illustrates an example histogram generation 300, according to an example. The example histogram generation 300 illustrates a process used to determine the size of each bucket in a data set. The example histogram generation 300 processes a data structure 302 that contains a number of data items 304. The example histogram generation 300 in one example performs one pass over all data items 304 in the entire data structure 302 to simply count the number of occurrences of each key value in all of the data items 304.

The example histogram generation 300 creates a histogram 306 that includes a number of items that were counted having each respective key value. The example histogram generation 300 illustrates a case where there the key over which the data items 304 are to be sorted are able to have four possible values. Because the key is able to have one of four possible values, there are four buckets defined for the output sorted according to that key. The histogram 306 therefore contains four values that correspond to the number of data items that are to be stored in each bucket after the data set is sorted according to that key. A first bucket count 320 indicates the number of data items that have a key value of "1" and is therefore the number of data items to be placed in the first bucket 310, a second bucket count 322 indicates the number of data items that have a key value of "2" and is therefore the number of data items to be placed in the second bucket 312, a third bucket count 324 indicates the number of data items that have a key value of "3" and is therefore the number of data items to be placed in the third bucket 314, and a fourth bucket count 326 indicates the number of data items that have a key value of "4" and is therefore the number of data items to be placed in the fourth bucket 316. The values determined for the histogram 306 are used in one example to set head pointers and tail pointers into the data structure 302 to support radix sorting, such as is described above with regards to the example in-place radix sort 200.

In one example, the histogram for a data set is able to be performed by a number of processors operating in parallel. In one example, a data structure 302 is able to be evenly divided into a number of segments of equal size, with one segment being assigned to a separate processor to accumulate the histogram data for that segment. In the illustrated example histogram generation 300, the data structure 302 is divided into three segments, a first segment 340, a second segment 342, and a third segment 344. In this example, each of these three segments have an equal number of data items, which is one third of the number of data items in the data set stored in the data structure 302. A first processor is assigned to count occurrences of key values in the first segment 340, a second processor is assigned to count occurrences of key values in the second segment 342, and a third processor is assigned to count occurrences of key values in the third segment 344. Each of these processor counts these occurrences, and the histogram data counted by each processor for each key value are then added together to determine the total number of occurrences of each key value in the entire data structure 302 that is to be sorted.

In an example, a radix sort is performed on data stored in an external storage device or structure, such as a mechanical disk drive, where data stored on the external device is read and exchanged to perform an in-place radix sort as is described above. In an example, performing an in-place radix sort on data stored on an external storage device is similar to that discussed above with regards to the example in-place radix sort process 200 of FIG. 2, except that the entire data set to be sorted is not stored in a local memory. In general, an in-place radix sort on data stored on an external storage device retrieves relevant portions of data from the external storage device into one or more local memory buffers for processing by the processor. The processor then performs the above described data swapping with the data that is stored in those memory buffers. Because the amount of memory used for the memory buffers is generally smaller than the amount of data stored in the external storage and being sorted by an in-place radix sort, new data is often read in and replaces data stored in the buffers as the in-place radix sort progresses.

One parameter that is able to be chosen for a radix sort is the radix "size" used to perform the sort. In the following discussion, the terms "radix" and "radix size" refer to the number of bits used to represent a particular radix value. For a "radix" or "radix size" of "N," the number of buckets that correspond to the "radix" or "radix size" of "N" is $2^N$. For example, an in-place radix sort on data represented by binary data is able is use a radix size that is specified as a certain number of bits. Frequently eight bits is selected as a radix size since processors are able to efficiently handle data of that size.

In the examples described below, an in-place radix sort is performed on data stored on an external device by reading portions of the data into a local memory buffer, sorting the data that was retrieved into that local memory buffer with an in-memory, in-place radix sort, and then storing the sorted data in the local memory buffer into the proper location of the external data storage file for the radix value of that data. This processing flow reduces the number of input/output (I/O) operations with the external storage device that are used to process each data item in the data set to be sorted. In the examples, described below, the data read into the data buffer is selected from the data set to be sorted in order to improve the overall speed of the sorting process.

Figure 4:
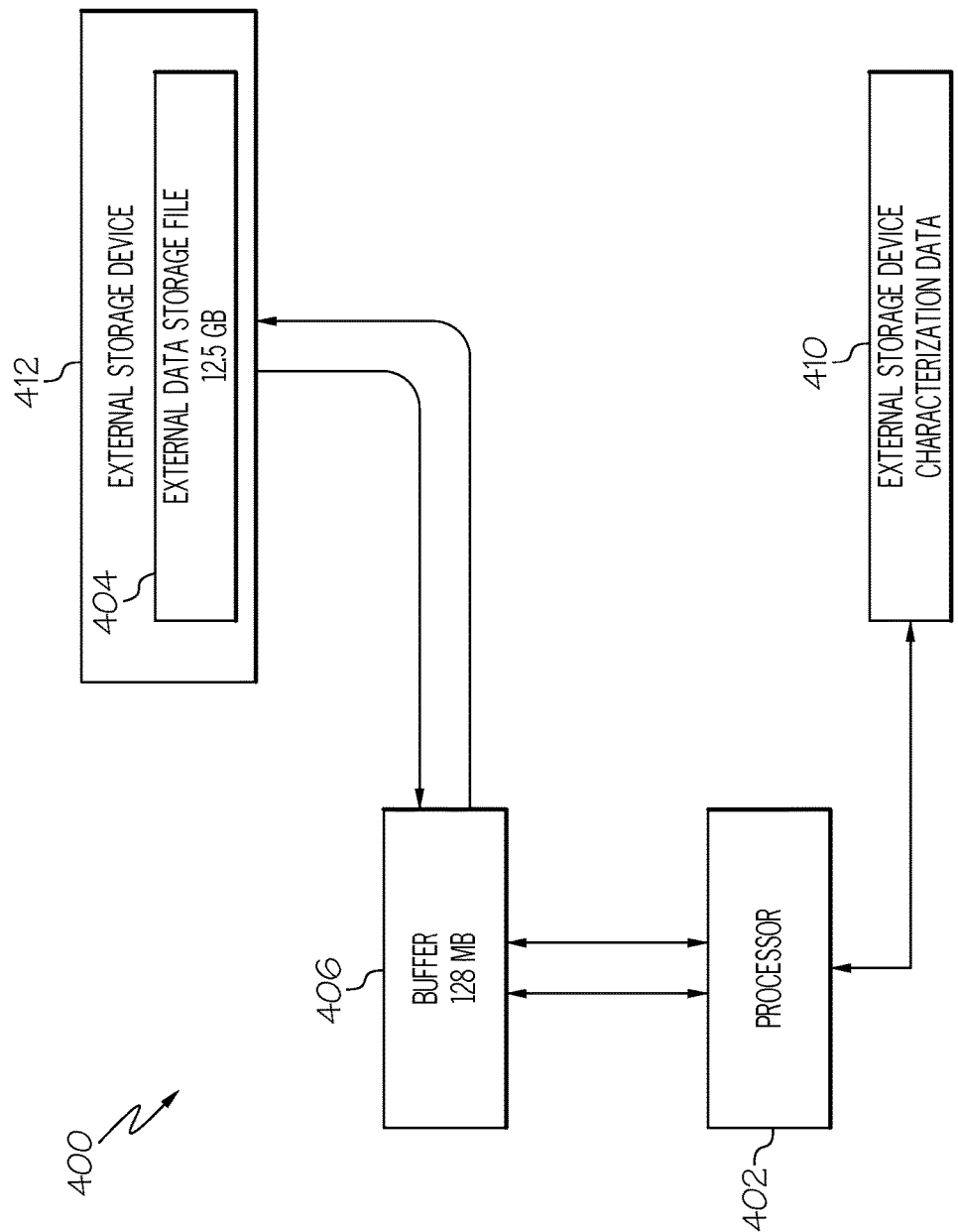
FIG. 4 illustrates an external data in-place radix sorting processor architecture, according to an example.

FIG. 4 illustrates an external data in-place radix sorting processor architecture 400, according to an example. The external data in-place radix sorting processor architecture 400 depicts an example of processing elements used to perform an in-place radix sort on data that is stored in an external data storage file 404. The external data storage file 404 in an example is stored on an external storage device, such as a magnetic/mechanical hard drive or other device In the course of performing an in-place radix data sort, a processor 402 reads and writes data from the external data storage file 404. In an example, the amount of data stored in the external data storage file 404 is larger than the amount of local memory available to the processor 402 for performing the in-place radix sort. For example, the external data storage file 404 is able to store 12.5 Gigabytes (GB) of data while the amount of local memory, such as Random Access Memory (RAM), available to the processor 402 for performing the in-place radix data sort may be much smaller. In an example, a buffer size of 128 Megabytes (MB) is an example of an amount of local memory that is allocated for the buffer 406 to hold portions of data for in-place radix sorting of the data stored in the external data storage file 404. In order to handle processing the data in the external data storage file 404, the processor 402 reads portions of the data stored in the external data storage file 402 into a buffer 406 that is in local memory of the processor 402. The size of the buffer 406 is generally much smaller than the size of the external data storage file 404, therefore causing data loaded into the buffer 406 for one operation to be replaced with other data from the external data storage file 404 for a subsequent operation that operates on data within a different portion of the external data storage file 404.

As is described in further detail below, examples of an externally stored data radix sort selects a size and location of blocks of data within the external data storage file to be read into the buffer 406 for processing where the size and locations are selected to reduce the amount of time spent to read and write the data in the external storage device 412. The size of each of these blocks is selected to reduce the total amount of time to perform the data input and output operations associated with an in-place data sort of the data within the external data storage file 404. In an example, the time for performing an in-place radix sort for the data in the external data storage file 404 is a function of the time used to read and write each block of the selected size and the total number of block reads and writes that are used in sorting the data. The processor 402 determines parameters for an externally stored data in-place radix data sort, as is described below, based on the input/output characteristics of the external storage device 412.

The processor 402 in some examples receives, maintains, or receives and maintains an external storage access characterization data 410. In various examples the external storage access characterization data 410 stores data characterizing the time it takes to write and read data blocks of various sizes to and from the external storage device 412. In an example, the external storage access characterization data 410 is determined by any suitable technique, such as performing a characterization test at suitable times of the external storage device 412 on which the external data storage file 404 is stored. For example, the processor 402 is able to perform testing by reading and writing data blocks of various sizes to the external storage device 412 at times such as when a new external storage device 412 is first installed in a system, when a processor 402 first uses a particular external storage device 412 to perform an in-place radix sort on data stored thereon, at other suitable times, or at combinations of any of these. The processor 402 is also able to receive or otherwise obtain data stored in the external storage access characterization data 410 by other means, such as by receiving characterization data measured or calculated for various types, model numbers, or the like, of external storage devices by methods such as factory testing of sample devices or by analysis of external storage device designs.

Figure 5A:
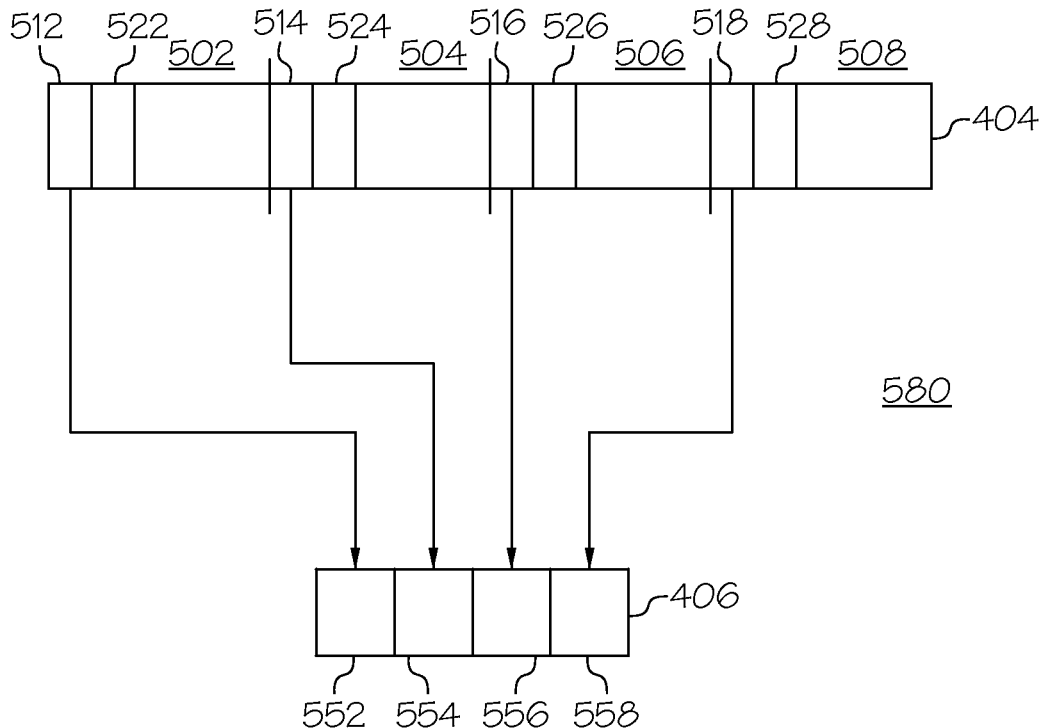
FIGS. 5A and 5B illustrate an externally stored in-place radix sort buffer exchange, according to an example.
Figure 5B:
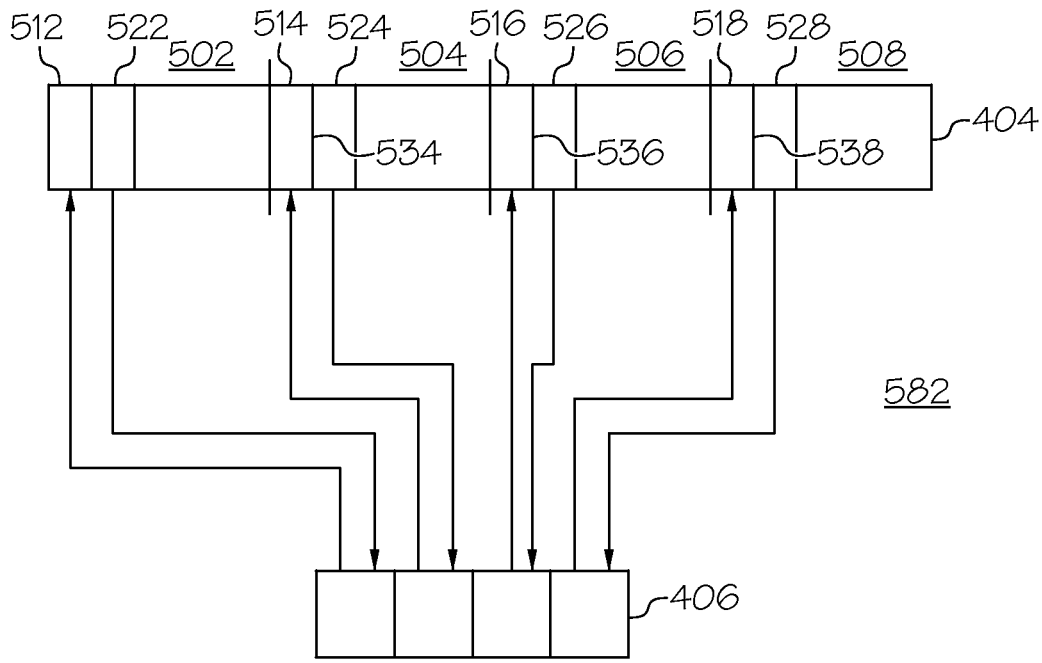

FIGS. 5A and 5B illustrate an externally stored in-place radix sort buffer exchange, according to an example. With reference to the elements described above with regards to the external data in-place radix sorting processor architecture 400, FIG. 5A depicts an initial buffer loading 580, and FIG. 5B depicts a post buffer sort data exchange 582. In this illustrated example, the initial buffer loading 580 depicts loading of the buffer 406 with selected portions of the data to be sorted that is stored within the external data storage file 404. As is discussed in further detail below, the data that is initially loaded into the buffer 406 is sorted with an in-memory in-place radix sort according to a particular radix size. Once the data that is within the buffer 406 is sorted according to the particular radix size, the sorted data is then written back to the proper locations in the external data storage file 404 as is depicted by the post buffer sort data exchange 582. The post buffer sort data exchange 582 further depicts the next set of data being loaded into the buffer 406 in order to perform an in-memory in-place radix sort on that data.

The initial buffer loading 580 and the post buffer sort data exchange 582 depict sorting data within the external data storage file 404 based on a selected radix. The selection of a particular radix to use is described in detail below. For ease of description and understanding, the example presented in the initial buffer loading 580 and the post buffer sort data exchange 582 uses a two (2) bit radix that corresponds to the data being sorted into four (4) buckets. In an example, the data within the external data storage file 404 is processed to determine a histogram of the data, such as is described above with regards to the example histogram generation 300. Dividing points between these four buckets within the external data storage file 404 are then determined based on that histogram data. The external data storage file 404 is shown to be divided into four (4) buckets: a first bucket 502, a second bucket 504, a third bucket 506, and a fourth bucket 508. These four buckets are shown to be divided by three bucket boundaries, a first bucket boundary 534 separating the first bucket 502 from the second bucket 504, a second bucket boundary 536 separating the second bucket 504 from the third bucket 506, and a third bucket boundary 538 separating the third bucket 506 from the fourth bucket 508. These bucket boundaries are determined based on determining a histogram for the entire data set within the external data storage file 404.

The buffer 406 is divided into a number of segments that correspond to the number of values of the radix being used for the sort, which also corresponds to the number of buffers in the external data storage file 404. The buffer 406 is divided into four (4) segments. The buffer 406 has a first segment 552, a second segment 554, a third segment 556, and a fourth segment 558. In an example, each segment in the buffer 406 is loaded with data from a different bucket of the external data storage file and sorted according to an in-memory in-place radix sort.

Two respective data segments are shown at the head of the each bucket of the external data storage file 404. The first bucket 502 has a first bucket first segment 512 and a first bucket second segment 522, the second bucket 504 has a second bucket first segment 514 and a first bucket second segment 524, the third bucket 506 has a third bucket first segment 516 and a third bucket second segment 526, and the fourth bucket 508 has a fourth bucket first segment 518 and a fourth bucket second segment 528. When an externally stored data in-place radix sort is started in an example, the first segment of each bucket is read into the corresponding segment of the buffer 406. In the illustrated example, the first bucket first segment 512 is loaded into the first segment 552, the second bucket first segment 514 is loaded into the second segment 554, the third bucket first segment 516 is loaded into the third segment 556, and the fourth bucket first segment 518 is loaded into the fourth segment 558. As is described below, once each respective first segment is loaded in to the buffer 406, an in-memory in-place radix sort using the particular radix, which corresponds to two bits in this example, is performed on the data in the buffer 406.

The post buffer sort data exchange 582 depicts the exchange of data in the buffer 406 and the external data storage file 404 after the data in the buffer 406 is sorted. In an example, the data in the respective segments of the buffer 406 is then written back into the associated locations of the buckets within the external data storage file 404. In association with writing each segment back into the external data storage file 404, the next segment is also read in from each respective bucket in the external data storage file 404. In an example, the first segment 552 is stored in the first bucket first segment 512 and the first bucket second segment 522 is read into the first segment 552, the second segment 554 is stored in the second bucket first segment 514 and the second bucket second segment 524 is read into the second segment 554, the third segment 556 is stored into the third bucket first segment 516 and the third bucket second segment 526 is read into the third segment 556, and the fourth segment 558 is stored into the fourth bucket first segment 518 and the fourth bucket second segment 528 is read into the first segment 552.

As is shown in the data exchanges depicted in the initial buffer loading 580 and the post buffer sort data exchange 582, the size of each segment of data read from the external data storage file 404 is dependent upon the size of the buffer 406 and the size of the radix used in the in-place radix sort. In particular, the buffer 406 is divided into X segments, where X is the number of possible values of the radix. In the example of a radix that is a power of two (2), X is $2^N$ where N is the number of bits in the radix. In general, reading smaller segments from an external storage device is faster than reading larger segments. However, reading such smaller segments requires more segments to be read which may cause the time to read the entire data set to be longer. The following described examples depict performing an in-place radix sort using a first radix on externally stored data by breaking that sort into two or more recursive in-place radix sorts using smaller radix sizes in order to better utilize the faster in-memory radix sorting using the buffer 406.

It has been observed that using small radix sizes when performing an in-place radix sort on externally stored data can greatly increase the speed of each level of the radix sort. The speed increase has been observed to be sufficiently significant that in some cases it has been observed that a faster in-place radix sort is able to be performed on externally stored data by splitting a single level in-place radix sort with a first radix size, e.g., seven (7) bits, into a multiple level recursive in-place radix sort that is performed on the same externally stored data. In an example that uses a two level recursive in-place radix sort, the two radix sorts each use a respective radix that is smaller than the first radix size, but the number of bits in these two radix sizes add up to the number of bits in the first radix size. In an example of a one level in-place radix sort with a seven (7) bit radix, the same sort is able in one example to be performed by sorting the externally stored data with an in-place radix sort using a three (3) bit radix to produce a first level sorted data set within the external data storage file, and then performing a second level in-place radix sort on that first level sorted data set using a radix size of four (4) bits. The sum of bits that represent the radix size for these two recursive in-place radix sorts is equal to the number of bits in the first radix size, and therefore the same sorted data set is produced. Because of the faster performance of using smaller radix sizes, the two level in-place radix sort is performed faster than the one in-place radix sort using a lager radix size.

Figure 6:
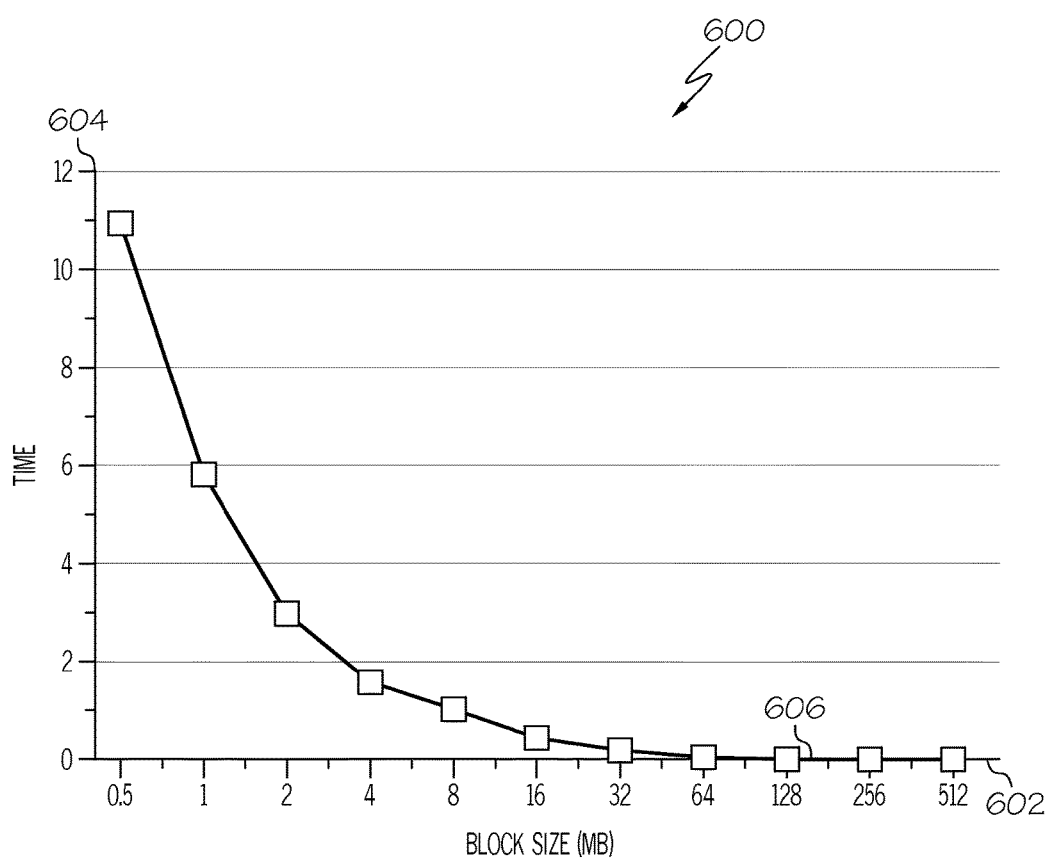
FIG. 6 illustrates an external storage block size vs. access time relationship, according to an example.

FIG. 6 illustrates an external storage block size vs. access time relationship 600, according to an example. The external storage block size vs. access time relationship 600 depicts the relationship between block size, as depicted on the X axis 602, and access time, as depicted on the Y axis 604. The relationship between block size and access time is depicted by a performance curve 406. The external storage access characterization data 410 described above is able to store data reflecting this relationship in order to support selecting radix sizes to reduce the total time required to perform an in-place radix sort. The external storage access characterization data 410 is used in estimating a total execution time for the in-place radix sort of the data set in the external data storage file 404.

Figure 7:
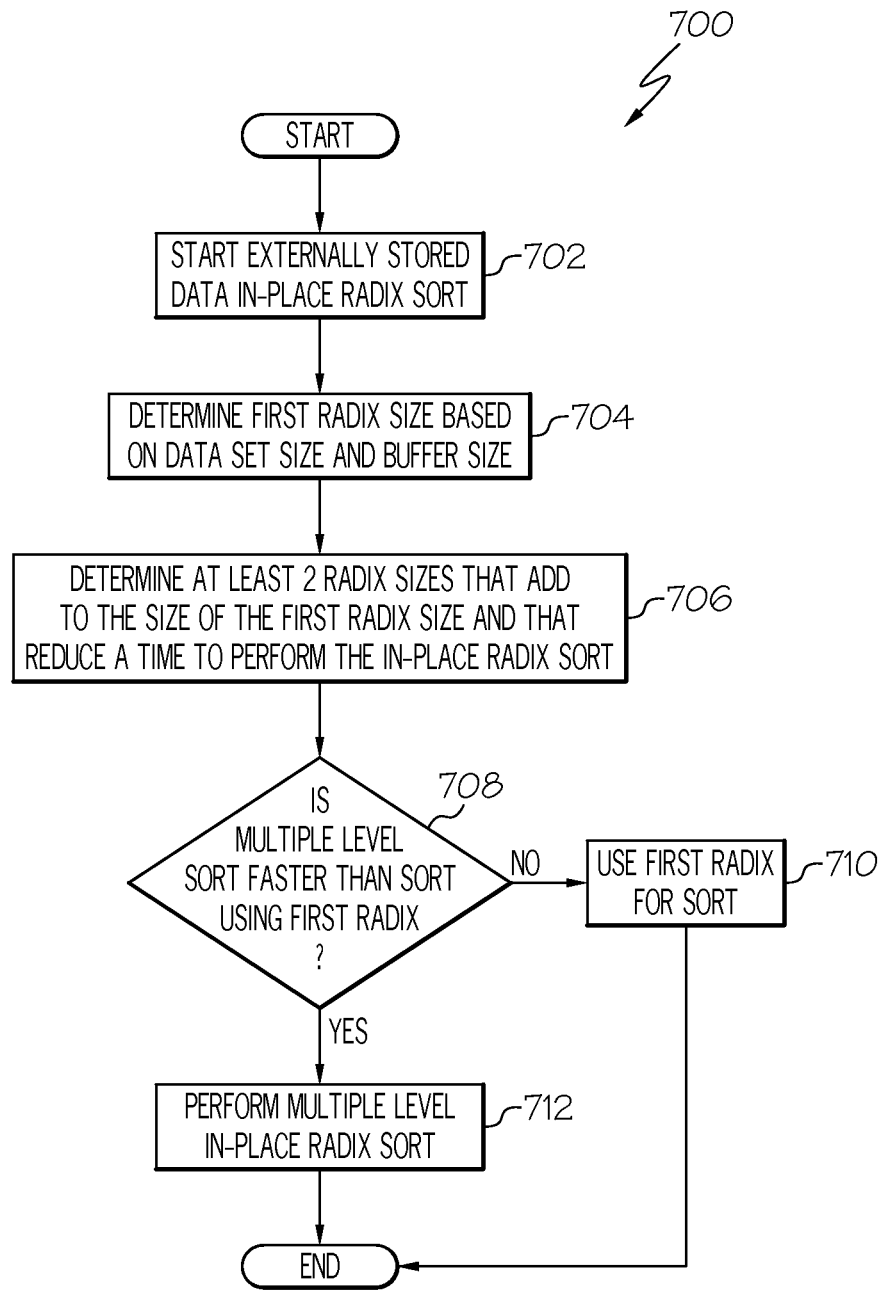
FIG. 7 illustrates an externally stored data in-place radix sort process, according to an example.

FIG. 7 illustrates an externally stored data in-place radix sort process 700, according to an example. The externally stored data in-place radix sort process 700 is an example of a process performed by the processor 402 described above with regards to the external storage block size vs. radix sort run time relationship 700.

The externally stored data in-place radix sort process 700 begins by starting, at 702, an externally stored data in-place radix sort. Starting an externally stored data in-place radix sort in one example includes receiving an indication of the externally stored data set to be sorted, such as a data set stored in the above described external data storage file 404. Starting the externally stored in-place radix sort is also able to include receiving various other parameters for the sort to be performed, and possibly other information pertaining to the sort. In an example, starting the externally stored in-place radix sort may include receiving an indication of the size of the buffer, such as buffer 406 described above. Starting the externally stored in-place radix sort may also or alternatively include determining the size of the buffer to be used based on various characteristics of the data set to be sorted, memory available to perform the sort, other aspects, or combinations of these.

The externally stored data in-place radix sort process 700 continues by determining, at 704, a first radix size to be used to perform an initial level in-place radix sort on the specified externally stored data set. In one example, the first radix size is selected to be able to store the quotient of the size of the data set to be sorted and the size of the buffer. In an example, the data set to be sorted, which is stored in the external data storage file 404, has a size of 12.5 GB, and the buffer 406 has a size of 128 MB. The quotient of 12.5 GB/128 MB is 98. A binary value with at least seven (7) bits is able to store this quotient, thereby causing the selection of a first radix size to be seven (7) bits. In the following discussion, the number of bits used to represent the first radix size is "N" and the number of buckets corresponding to the first radix size is $2^N$.

The externally stored data in-place radix sort process 700 continues by determining, at 706, based on external storage device performance data, at least two smaller radix sizes for recursive in-place radix sorts, where the at least two smaller radix sizes add up to the first radix size. In the current example, the first radix size is determined to be seven (7) bits. Several combinations of smaller radix sizes are able to be selected to add up to seven (7) bits. In one example, two (2) smaller radix sizes of three (3) bits and four (4) bits, respectively, are able to be selected. In another example, three (3) smaller radix sizes of two (2) bits, two (2) bits, and (3) bits, respectively, are able to be selected. In these examples, the single in-place radix sort using a seven (7) bit radix is able to be alternatively performed by either a two level recursive in-place radix sort using a three (3) bit radix followed by a lower level in-place radix sort using a four (4) bit radix, or by a three level recursive in-place radix sort using a two (2) bit radix, followed by a lower level in-place radix sort also using a two (2) bit radix, that is followed by a next lower level in-place radix sort using a three (3) bit radix.

In an example, the selection of the number of smaller radix sizes to use, which corresponds to the number of recursive levels of in-place radix sorting to be performed, as well as the values of those radix sizes, are selected to reduce the total amount of time to sort the externally stored data set according to the first radix size. For example, a value is determined that reflects the time it would take to perform a single in-place radix sort of the specified data set using the first radix size. Values are then determined that each reflect the time it would take to perform each level of one or more respective multiple level recursive in-place radix sorts, where the respective radix sizes for all levels of a respective multiple level recursive in-place radix sort add up to the first radix size. The values reflecting the time it would take to perform the various in-place radix sorts using different radix sizes are able to be determined in an example based on the external storage access characterization data 410, described above.

The externally stored data in-place radix sort process 700 determines, at 708, if a multiple level recursive in-place radix sort, where each level uses a respective smaller radix size, is faster than a single level in-place radix sort using the first radix size. If the single level in-place radix sort is faster than using a multiple level recursive radix sort, the single level in-place radix sort is performed, at 710. If the multiple level recursive in-place radix sort is faster than the single level radix sort, the multiple level recursive in-place radix sort using the smaller radix sizes is performed, at 712.

After performing one of the single level in-place radix sort or the recursive multiple level radix sort, the externally stored data in-place radix sort process 700 continues by performing subsequent levels of in-place radix sorting on the externally stored data set. These subsequent levels are also able to include the above processing to determine if the in-place radix sort for one or more of the subsequent levels is able to be performed faster by dividing one or more of these subsequent levels into a multiple level recursive in-place data sort using smaller radix sizes. The externally stored data in-place radix sort process 700 then ends.

Figure 8:
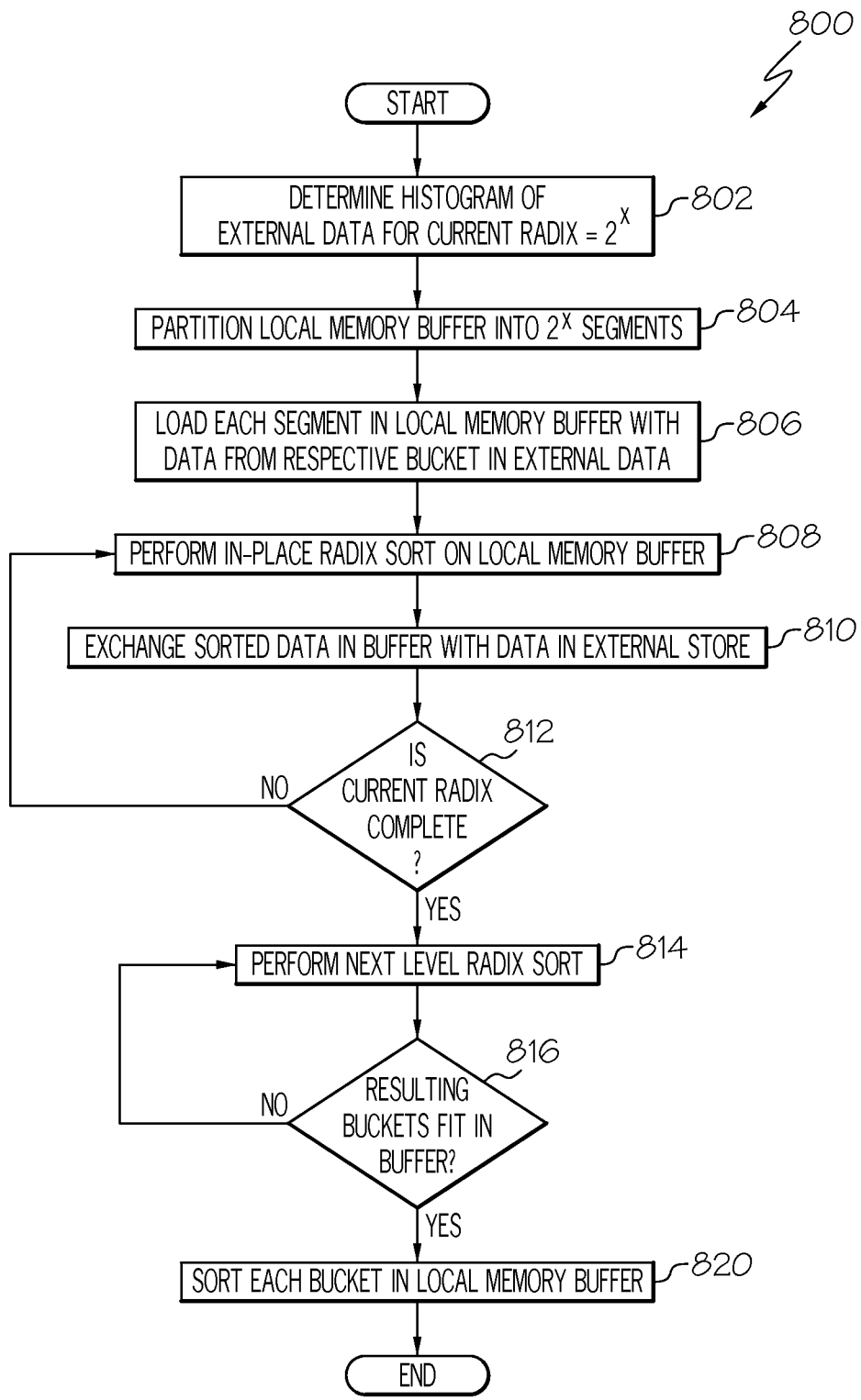
FIG. 8 illustrates a complete in-place radix sort process, according to an example.

FIG. 8 illustrates a complete in-place radix sort process 800, according to an example. The complete in-place radix sort process 800 depicts an in-place radix sorting process that incorporates the above described externally stored data in-place radix sort process 700 to perform a complete sort of the data set stored in the external data storage file 404.

The complete in-place radix sort process 800 begins by determining a histogram, at 802, of the data set stored in the external data storage file 404 based on a current radix size. In an example, the current radix size is determined as is described above based on the size of the buffer 406 and the size of the data set stored in the external data storage file 404. In one example, the current radix is an integer power of two (2), such that the current radix can be represented as $2^N$, where N is the number of bits in the current radix. Based on this histogram, the data set stored in the external data storage file is divided into $2^N$ buckets.

The complete in-place radix sort process 800 continues by partitioning, at 804, the buffer 406 into $2^N$ segments. Each of the $2^N$ segments is then loaded, at 806, from a respective bucket within the data set stored in the external data storage file 404. An in-memory, in-place radix sort is then performed, at 808, on the data within the buffer 406. In an example, the in-memory in-place radix sort is similar to that described above with regards to FIGS. 1-3.

After the in-memory in-place radix sort of the data in the buffer 406 is complete, the data in the buffer 406 is exchanged, at 810, with data in the external data storage file 404. As described above, the sorted data in the buffer is placed in the locations that were used to fill the buffer 406, and then the buffer 406 is filled with subsequent segments from each bucket in the external data storage file 404. In the case of processing the last segments in the buckets of the external data storage file 404, no data is read into the buffer 406 at this point.

A determination is then made, at 812, if the in-place radix sort of the data in the external data storage file 404 according to the current radix is complete. The sort is complete when all of the data in the external data storage file 404 has been processed according to 808 and 810 above. If it is determined that the sort is not complete, processing returns performing an in-place radix sort, at 808, of the data in the buffer 406.

If the sort using the current radix is determined to be complete, the process continues to perform a next level radix sort using a subsequent radix size, at 814. As described above, an in-place radix sort using a first radix size is able to be divided into a multiple level in-place radix sort using smaller radix size.

After performing the next level in-place radix sort, a determination is made, at 816, as to whether the resulting buckets after the radix sort using the subsequent radix size in the external data storage file 404 are able to each be stored in the buffer 406. If it is determined that all buckets are not able to be stored in the buffer 406, the process returns to performing, at 814, a next, i.e., lower, level in-place radix sort of the data in the external data storage file 404, according to the techniques described above.

If it is determined that each bucket in the external data storage file 404 is able to be stored in the buffer 406, the process sorts, at 820, each bucket in the external data storage file within the buffer 406. In an example, each bucket is loaded into the buffer 406, sorted according to an in-memory in-place radix sort and then the sorted data for that bucket is returned to the same location in the external data storage file 404. The process then ends.

Figure 9:
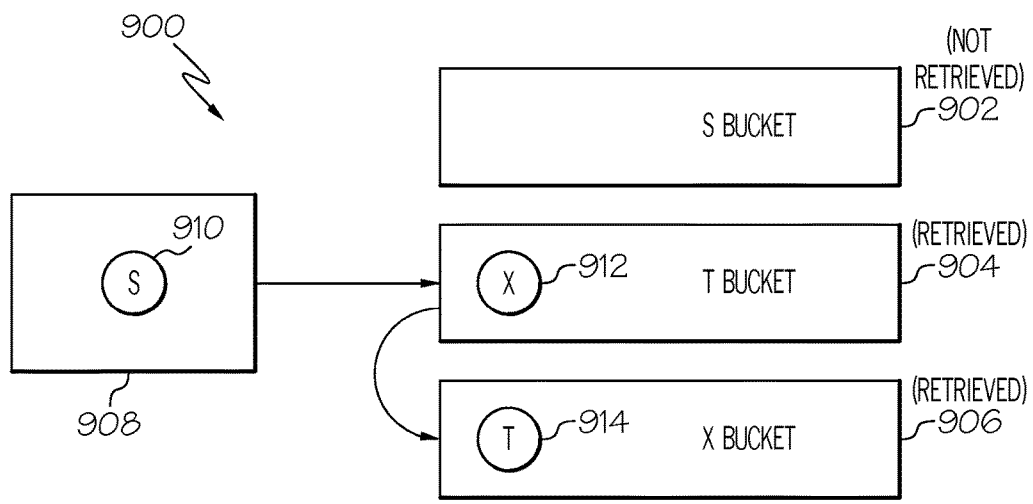
FIG. 9 illustrates an initial buffer state, according to an example.
Figure 10:
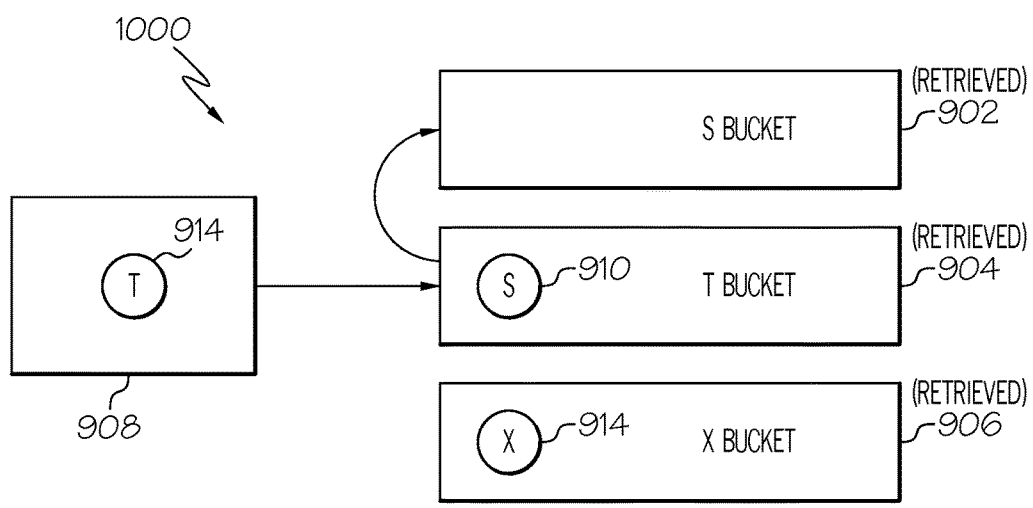
FIG. 10 illustrates a subsequent buffer state, according to an example.

FIGS. 9 and 10 illustrate a state of three local memory buffers during a data element hopping process, according to an example. In some examples, a data element hopping process is able to be used to accommodate delays in reading data from an externally stored data set into the local buffer memory of the processor performing the in-place radix sort. In an example, in the course of performing an in-place radix sort on externally stored data, a data element may be encountered that is to be stored into a portion of the externally stored data set that is not present in a local buffer of the processor performing the sort. In general, a delay occurs for that portion of the externally stored data to be read into a local memory buffer to allow the processor to continue to perform the data sort. The data element hopping process described below accommodates this delay by continuing on with performing the in-place radix sort for other data elements in the externally stored data set.

FIG. 9 illustrates an initial buffer state 900, according to an example. The initial buffer state 900 depicts three buffers that store portions of data within the externally stored data set to be sorted, where each bucket is depicted as corresponding to buckets in the data set used for the in-place radix sort.

The initial buffer state 900 depicts an S buffer 902, a T buffer 904, and an X buffer 906. In order to more clearly describe the relevant aspects of the data element hopping process, the buffers and data element values are referred to by the values of the key of the data element or of the buffer used for the radix sort. In the initial buffer state 900, a present data element S 910, which has a key value of S for the radix sort, is being processed by the processor 908 and is to be placed into the S buffer 902. The initial buffer state 900 indicates that the S buffer 902 is not retrieved into the local memory used by the processor. In an example, the processor 908 attempts to store the present data element S 910 into the S buffer 902, and triggers the retrieval of a portion of data from the externally stored data set into the S buffer 902. The data element hopping process uses the time used to retrieve data into the S buffer 902 to continue radix sorting of other data elements as is described below.

Upon a determination that the S buffer 902 is not retrieved, the data element hopping process selects any buffer that has data that is retrieved into a local memory buffer of processor 908. In the illustrated example, the T buffer 904 is chosen and the present data element S 910 is swapped with a second data element X 912 that is at the head of the T buffer 904. The second data element X 912 has a key value of X in this example. The data element hopping process does not adjust the head pointer of the T buffer 904 in this case since the present data element S 910 is merely placed in the T buffer 904 to accommodate the delay in retrieving data from the S buffer 902. Upon receiving the second data element X 912 from the head of the T buffer 904, the processor 908 places the second data element X 912 into the X buffer 906, which in this example is illustrated as being retrieved into the local memory buffer from the externally stored data set. In this example, a third data element T 914 was at the head of the X buffer 906, and is held by processor 908 after being swapped at the head of the X buffer 906 with the second data element X 912.

FIG. 10 illustrates a subsequent buffer state 1000, according to an example. The subsequent buffer state 1000 depicts the buffers illustrated in the initial buffer state 900 after the above described process, where the second data element X 912 is placed into the X buffer 906 and the third data element T 914 is in the processor 908. The third data element T 914 has a key value of T and is therefore to be placed into the T buffer 904. In this example, which has been constructed to facilitate description and understanding of the data element hopping process, the third data element T 914 is swapped with the element at the head of the T buffer 904, which is the initial data element S 910 that was placed there previously as is described above. In this example, the S buffer 902 has now been retrieved from memory and the initial data element S 910 is now able to be written into the S buffer 902, and the data element that was at the head of the S buffer 902 is able to be processed according to the radix sorting algorithm.

It is understood that the delay in retrieving data into the S buffer 902 in the above example may be much longer than the time required for two data element swaps as is described above. The above example is presented for ease of illustration and understanding, and it is understood that multiple data swaps associated with an in-place radix sort are often to be performed before encountering a data element to be placed into the buffer that was chosen as a location for placing the initial data element S 910 when the S buffer 902 was determined to not be available. Further, it is understood that the above described process is able to be performed for multiple buffers that are not retrieved into local memory, by merely placing a data element destined to the not retrieved buffer into any buffer that is retrieved into local memory for use by the processor.

Figure 11:
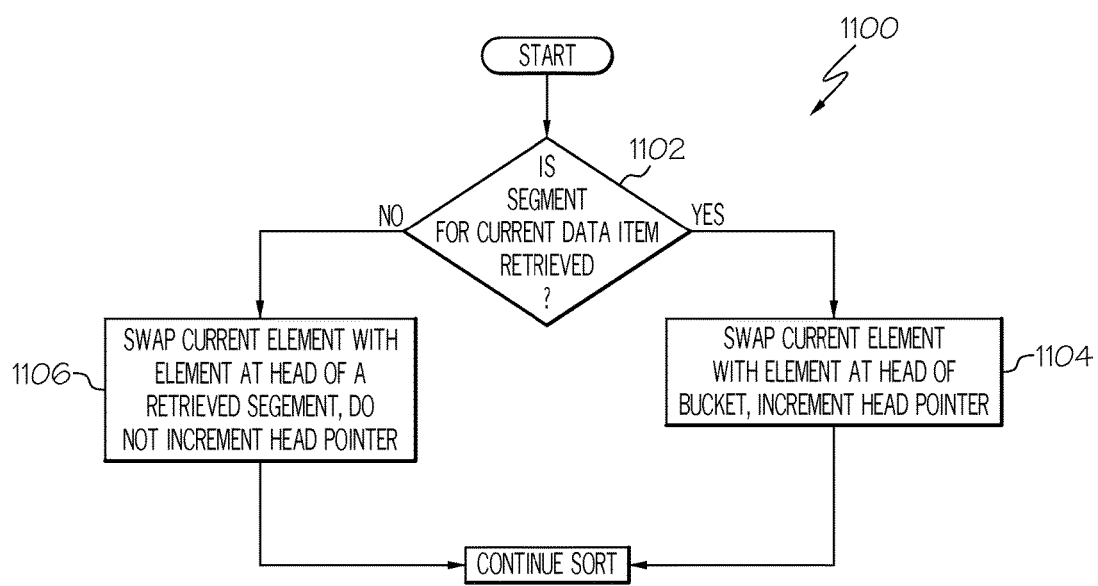
FIG. 11 illustrates a data element hopping process, according to an example.

FIG. 11 illustrates a data element hopping process 1100, according to an example. The data element hopping process 1100 is an example of a process performed by the processor 402, described above, during an in-place radix sort on an externally stored data set. The data element hopping process 1100 in an example performs the data manipulation depicted in FIGS. 9 and 10 and described above. In the below description, the data element hopping process 1100 is performed during an in-place radix sort when the processor has a data element, referred to as the current data element, whose destination bucket is known based upon the key value of that data item. As described above, an in-place radix sort normally swaps the current data element with the data element stored at the head of the destination bucket fort the current data element. The data element hopping process 1100 improves the performance of an in-place radix sort when encountering a destination bucket whose data has not been retrieved into a local memory buffer. When the data within a destination bucket within externally stored data for current data element has not been retrieved into a local memory, the data within that destination bucket is retrieved from the external storage into a local memory buffer for use by the processor performing the in-place radix sort. As described below, the data element hopping process 1100 continues with sorting other data elements when it is determined that the data in a destination bucket for a current data element has not been retrieved into a buffer, thereby utilizing the time during which the data in the destination bucket is being retrieved into a local memory buffer.

The data element hopping process 1100 begins in one example by determining, at 1102, if a storage location into which a current data item is to be stored has been retrieved into a local memory data buffer. In an example, this storage location is pointed to by the head pointer of the destination bucket within the data set being sorted by an in-place radix sort. If it is determined that the storage location has been retrieved into a local memory buffer, the data element hopping process 1100 continues by swapping, at 1104, the current data item with the data item stored at the head of the proper destination bucket.

If it is determined that the storage location has not been retrieved into a local memory buffer, the data element hopping process 1100 continues by swapping, at 1106, the current data item with a data item in any bucket of the in-place radix sort, where data pointed to by the head pointer of that bucket is within data has been retrieved into a local memory buffer. The utilization of buffer head pointers in an example in-place radix sort process is described in further detail above. In an example, a buffer in the local memory of a processor is able to be selected at random, in a round robin fashion, according to any algorithm, or combinations of these, from among buffers in the local memory that contain data pointed to by a bucket head pointer.

In this example, once the current data item is swapped with the data item in a bucket that is stored in a local memory buffer, the head pointer of that bucket is not incremented. As discussed above, once a data item that is to be placed in a particular bucket, such as determined by the key value of that data item, the head pointer for that bucket is normally incremented. However, since the current data item in this example is not to remain in the selected bucket, head pointer is not incremented. When a subsequent data item that is to be placed in to that bucket is encountered, the current data item that was placed there, at 1106, the subsequent data item will be swapped with that current data item. After this later swap, the present data item will be placed into its proper bucket, which is likely to have been retrieved into a local memory buffer due to the attempted access performed initially, such as in conjunction with the determination described above, at 1102.

After swapping the current data item with either a data item pointed to by the head pointer of the proper destination bucket, or with a data item pointed to by the head pointer of a bucket that is stored in a local memory buffer, the data element hopping process 1100 continues by performing the in-place radix sort, at 1108. In continuing to perform the in-place radix sort, further data items to be swapped with data at locations that have not been retrieved into a local memory buffer may be encountered, and the data element hopping process 1100 can be reiterated to further improve performance.

Information Processing System

Figure 12:
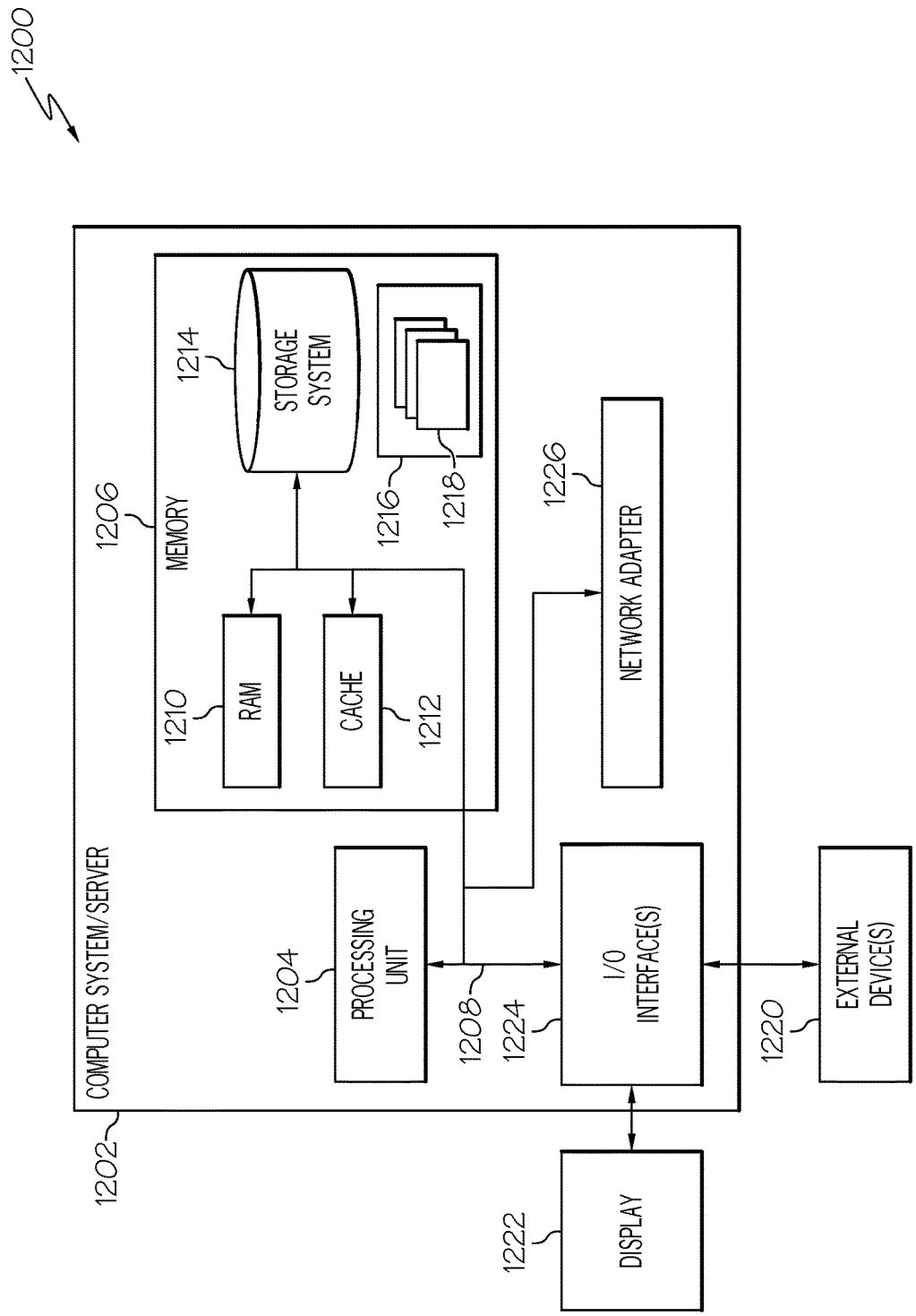
FIG. 12 is a block diagram illustrating one example of an information processing system according to one example.

Referring now to FIG. 12, this figure is a block diagram illustrating an information processing system that can be utilized in various examples of the present disclosure. The information processing system 1202 is based upon a suitably configured processing system configured to implement one or more embodiments of the present disclosure. Any suitably configured processing system can be used as the information processing system 1202 in embodiments of the present disclosure. In another embodiment, the information processing system 1202 is a special purpose information processing system configured to perform one or more embodiments discussed above. The components of the information processing system 1202 can include, but are not limited to, one or more processors or processing units 1204, a system memory 1206, and a bus 1208 that couples various system components including the system memory 1206 to the processor 1204.

The bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 1206 can also include computer system readable media in the form of volatile memory, such as random access memory (RAM) 1210 and/or cache memory 1212. The information processing system 1202 can further include other removable/non-removable, volatile/non-volatile computer system storage media. By way of example only, a storage system 1214 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1208 by one or more data media interfaces. The memory 1206 can include at least one program product having a set of program modules that are configured to carry out the functions of various examples described above.

Program/utility 1216, having a set of program modules 1218, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. Program modules 1218 generally carry out the functions and/or methodologies of the above described processes and systems.

The information processing system 1202 can also communicate with one or more external devices 1220 such as a keyboard, a pointing device, a display 1222, and the like. The information processing system 1202 is further able to communicate with one or more devices that enable a user to interact with the information processing system 1202; and/or any devices (e.g., network card, modem, etc.) that enable computer system/server 1202 to communicate with one or more other computing devices. Such communication can occur via I/O interfaces 1224. Still yet, the information processing system 1202 can communicate with one or more networks such as a local area network (LAN), a general wide area network (WAN), and/or a public network (e.g., the Internet) via network adapter 1226. As depicted, the network adapter 1226 communicates with the other components of information processing system 1202 via the bus 1208. Other hardware and/or software components can also be used in conjunction with the information processing system 1202. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   determining, based on a first radix size and performance characteristics of an external data storage device, a plurality of smaller radix sizes where a sum of smaller radix sizes within the plurality of smaller radix sizes equals the first radix size to be used by a multiple level recursive in-place radix sort of a data set stored on the external data storage device,
   the plurality of smaller radix sizes being further determined based upon a size of the data set and a buffer size to be used by the multiple level recursive in-place radix sort, the plurality of smaller radix sizes being further determined based on a reduction of a total time to perform the multiple level recursive in-place radix sort on the data stored on the external data storage device where each level of the multiple level recursive in-place radix sort has a respective radix size within the plurality of smaller radix sizes;
   performing, based on the determining, the multiple level recursive in-place radix sort on the data stored on the external data storage device where each level of the multiple level recursive in-place radix sort has a respective radix size within the plurality of smaller radix sizes, each respective level of the multiple level recursive in-place radix sort comprising:
   dividing the data set into N buckets;
   dividing a buffer into N buckets; and
   iteratively loading a respective segment in each bucket of the data set into a respective bucket of the buffer, performing a respective level of the multiple level recursive in-place radix sort on the data in the buffer, and returning sorted buffer data to the data set on the external data storage device;
   determining, while performing the respective level of the multiple level recursive in-place radix sort, that a data element within the data in the buffer that is being sorted by the respective level of the multiple level recursive in-place radix sort is to be swapped with data in a destination location that is not retrieved into local memory; and
   swapping, based on determining the data element being sorted is to be swapped with data in a destination location that is not retrieved into the local memory, the data element with another data element pointed to by a head pointer of another in-place radix sort bucket head pointer and that is in a portion of the data set that is retrieved into the local memory.

2. The method of claim 1, wherein the first radix size is based on a ratio of the size of the data set stored on the external data storage device and the buffer size to be used by the multiple level recursive in-place radix sort.

3. The method of claim 1, further comprising receiving an indication of the buffer size prior to determining the plurality of smaller radix sizes.

4. The method of claim 1, further comprising receiving, prior to determining, the plurality of smaller radix sizes, data defining the performance characteristics of the external data storage device.

5. The method of claim 1, further comprising characterizing, prior to determining the plurality of smaller radix sizes, the performance characteristics of the external data storage device.

6. The method of claim 1, wherein the performance characteristics of the external data storage device comprise data block read size versus radix sort completion time determined during a characterization test of the external data storage device, and wherein determining the plurality of smaller radix sizes is based upon a scaling of the performance characteristics based on a ratio of the size of the data set and a size of a data used in the characterization test.

7. A data set sorting apparatus, comprising:
   an interface to communicate with an external data storage device;
   a processor coupled to the interface;
   a memory coupled to the processor;
   a data sorting processor, coupled to the processor and the memory, the data sorting processor, when operating,
   determines, based on a first radix size and performance characteristics of an external data storage device, a plurality of smaller radix sizes where a sum of smaller radix sizes within the plurality of smaller radix sizes equals the first radix size to be used by a multiple level recursive in-place radix sort of a data set stored on the external data storage device,
   the plurality of smaller radix sizes being further determined based upon a size of the data set and a buffer size to be used by the multiple level recursive in-place radix sort, the plurality of smaller radix sizes being further determined based on a reduction of a total time to perform the multiple level recursive in-place radix sort on the data stored on the external data storage device where each level of the multiple level recursive in-place radix sort has a respective radix size within the plurality of smaller radix sizes;

performs, based on the determining, the multiple level recursive in-place radix sort on the data stored on the external data storage device where each level of the multiple level recursive in-place radix sort has a respective radix size within the plurality of smaller radix sizes, each respective level of the multiple level recursive in-place radix sort comprising:

dividing the data set into N buckets;
dividing a buffer into N buckets; and
iteratively loading a respective segment in each bucket of the data set into a respective bucket of the buffer, performing a respective level of the multiple level recursive in-place radix sort on the data in the buffer, and returning sorted buffer data to the data set on the external data storage device;

determines, while performing the respective level of the multiple level recursive in-place radix sort, that a data element within the data in the buffer that is being sorted by the respective level of the multiple level recursive in-place radix sort is to be swapped with data in a destination location that is not retrieved into local memory; and swaps, based on determining the data element being sorted is to be swapped with data in a destination location that is not retrieved into the local memory, the data element with another data element pointed to by a head pointer of another in-place radix sort bucket head pointer and that is in a portion of the data set that is retrieved into the local memory.

8. The apparatus of claim 7, wherein the first radix size is based on a ratio of the size of the data set stored on the external data storage device and the buffer size to be used by the multiple level recursive in-place radix sort.

9. The apparatus of claim 8, the data sorting process, when operating, further receives an indication of the buffer size prior to determining the plurality of smaller radix sizes.

10. The apparatus of claim 7, the data sorting process, when operating, further receives, prior to determining, the plurality of smaller radix sizes, data defining the performance characteristics of the external data storage device.

11. The apparatus of claim 7, the data sorting process, when operating, further characterizes, prior to determining the plurality of smaller radix sizes, the performance characteristics of the external data storage device.

12. The apparatus of claim 7, wherein the performance characteristics of the external data storage device comprise data block read size versus radix sort completion time determined during a characterization test of the external data storage device, and wherein the data sorting process, when operating, determines the plurality of smaller radix sizes based upon a scaling of the performance characteristics based on a ratio of the size of the data set and a size of a data used in the characterization test.

13. A computer program product for sorting a data set, the computer program product comprising:

a storage medium readable by a processing circuit and storing instructions for execution by the processing circuit for performing a method comprising:

determining, based on a first radix size and performance characteristics of an external data storage device, a plurality of smaller radix sizes where a sum of smaller radix sizes within the plurality of smaller radix sizes equals the first radix size to be used by a multiple level recursive in-place radix sort of a data set stored on the external data storage device, the plurality of smaller radix sizes being further determined based upon a size of the data set and a buffer size to be used by the multiple level recursive in-place radix sort, the plurality of smaller radix sizes being further determined based on a reduction of a total time to perform the multiple level recursive in-place radix sort on the data stored on the external data storage device where each level of the multiple level recursive in-place radix sort has a respective radix size within the plurality of smaller radix sizes;

performing, based on the determining, the multiple level recursive in-place radix sort on the data stored on the external data storage device where each level of the multiple level recursive in-place radix sort has a respective radix size within the plurality of smaller radix sizes, each respective level of the multiple level recursive in-place radix sort comprising:

dividing the data set into N buckets;
dividing a buffer into N buckets; and
iteratively loading a respective segment in each bucket of the data set into a respective bucket of the buffer, performing a respective level of the multiple level recursive in-place radix sort on the data in the buffer, and returning sorted buffer data to the data set on the external data storage device;

determining, while performing the respective level of the multiple level recursive in-place radix sort, that a data element within the data in the buffer that is being sorted by the respective level of the multiple level recursive in-place radix sort is to be swapped with data in a destination location that is not retrieved into local memory; and swapping, based on determining the data element being sorted is to be swapped with data in a destination location that is not retrieved into the local memory, the data element with another data element pointed to by a head pointer of another in-place radix sort bucket head pointer and that is in a portion of the data set that is retrieved into the local memory.

14. The computer program product according to claim 13, wherein the first radix size is based on a ratio of the size of the data set stored on the external data storage device and the buffer size to be used by the multiple level recursive in-place radix sort.

15. The computer program product according to claim 13, wherein the method further comprises receiving an indication of the buffer size prior to determining the plurality of smaller radix sizes.

16. The computer program product according to claim 13, wherein the method further comprises receiving, prior to determining, the plurality of smaller radix sizes, data defining the performance characteristics of the external data storage device.

17. The computer program product according to claim 14, wherein the method further comprises characterizing, prior to determining the plurality of smaller radix sizes, the performance characteristics of the external data storage device.

* * * * *